(12) United States Patent
Plevich et al.

(10) Patent No.: US 7,306,195 B2
(45) Date of Patent: Dec. 11, 2007

(54) ANTI-ICING ACTUATOR ASSEMBLY FOR PNEUMATIC VALVE

(75) Inventors: Chuck W. Plevich, Casa Grande, AZ (US); Gary T. Barker, Chandler, AZ (US); Ronald J. Louis, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 415 days.

(21) Appl. No.: 10/991,752

(22) Filed: Nov. 17, 2004

(65) Prior Publication Data

US 2006/0102232 A1    May 18, 2006

(51) Int. Cl.
*F16K 31/00* (2006.01)
(52) U.S. Cl. ............... 251/14; 251/28; 251/61; 137/487.5; 137/488
(58) Field of Classification Search ............ 251/14, 251/30.01, 28, 61, 331; 137/487.5, 488
See application file for complete search history.

(56) References Cited

U.S. PATENT DOCUMENTS

| | | | |
|---|---|---|---|
| 1,576,686 | A | 3/1926 | Terry |
| 1,742,892 | A * | 1/1930 | Belcher ............ 251/14 |
| 2,362,655 | A * | 11/1944 | Mallory ............ 477/111 |
| 2,770,251 | A | 11/1956 | Goddard et al. |
| 3,747,629 | A | 7/1973 | Bauman |
| 3,785,440 | A | 1/1974 | Shea |
| 3,825,029 | A | 7/1974 | Genbauffe |
| 3,902,695 | A | 9/1975 | Worwetz |
| 3,938,542 | A | 2/1976 | Bolha |
| 4,050,670 | A * | 9/1977 | Borg et al. ............ 251/14 |
| 4,105,088 | A * | 8/1978 | Levijoki ............ 180/177 |
| 4,217,969 | A | 8/1980 | Riddel |
| 4,269,028 | A | 5/1981 | Hattori |
| 4,431,026 | A | 2/1984 | Fehrenbach et al. |
| 4,527,769 | A * | 7/1985 | Stogner et al. ............ 251/14 |
| 5,279,325 | A | 1/1994 | Kaspers |
| 5,762,315 | A | 6/1998 | Eggleston |
| 5,988,204 | A | 11/1999 | Reinhardt et al. |
| 6,015,134 | A | 1/2000 | Johnson |
| 6,684,898 | B2 * | 2/2004 | Wiggins et al. ............ 137/15.25 |

* cited by examiner

*Primary Examiner*—John K. Fristoe, Jr.
(74) *Attorney, Agent, or Firm*—Ingrassia Fisher & Lorenz

(57) ABSTRACT

An actuator assembly for use in conjunction with a pneumatic valve assembly of the type which includes an airway having an inlet port, an outlet port, and a valve disposed within the airway and configured to be moved between an open position and a closed position, comprises a first actuator coupled to the valve for moving the valve between the open position and the closed position in a first operational mode, and a second actuator coupled to the valve for opening the valve in a second operational mode.

26 Claims, 9 Drawing Sheets

ANTI-ICING ACTUATOR ASSEMBLY FOR PNEUMATIC VALVE

TECHNICAL FIELD

The present invention relates generally to a pneumatic valve assembly, and more specifically to an anti-icing, pneumatic actuator assembly particularly suited for use in conjunction with an aircraft's air turbine starter control valve assembly.

BACKGROUND OF THE INVENTION

Pneumatic valves configured to be positioned within an airway and capable of opening to permit airflow and closing to obstruct airflow are well-known. When such valves close, moisture formed by condensation may become trapped between the valve plate and the interior of the airway. If the trapped moisture freezes, opening the valve may be impeded or even prevented (valve icing).

Valve icing is of concern in air turbine starter (ATS) valve assemblies used to initiate aircraft turbine engine rotation. When the ATS flow control valve is closed, condensation may be trapped between the flow control valve plate and airway's interior. This may be problematic after engine shutdown in low temperature environments (i.e. at or below freezing) because the collected water could freeze and valve icing could result. An iced ATS control valve may not open when commanded and consequently delay or prevent engine start and takeoff. Though the iced valve may be replaced or de-iced (e.g. heated), it is preferable to avoid the problem by preventing valve icing.

From the above, it should be appreciated that it would be desirable to provide a pneumatic valve assembly that minimizes the likelihood of valve icing.

BRIEF SUMMARY

According to an aspect of the invention there is provided an actuator assembly for use in conjunction with a pneumatic valve assembly of the type which includes an airway having an inlet port, an outlet port, and a valve disposed within the airway and configured to be moved between an open position and a closed position. The actuator assembly comprises a first actuator coupled to the valve for moving the valve between the open position and the closed position in a first operational mode, and a second actuator coupled to the valve for opening the valve in a second operational mode.

Other independent features and advantages of the preferred actuator assembly and corresponding pneumatic valve assembly will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it should be appreciated that the present invention is not limited to use in conjunction with a specific type of valve. Thus, although the present invention is, for convenience of explanation, depicted and described as being implemented in a pneumatically-operated butterfly valve such as that employed within an air turbine starter, it should be appreciated that it can be implemented in numerous other types of pneumatic valves, and in various other devices and environments in which pneumatic valves are used.

Figure 1A:
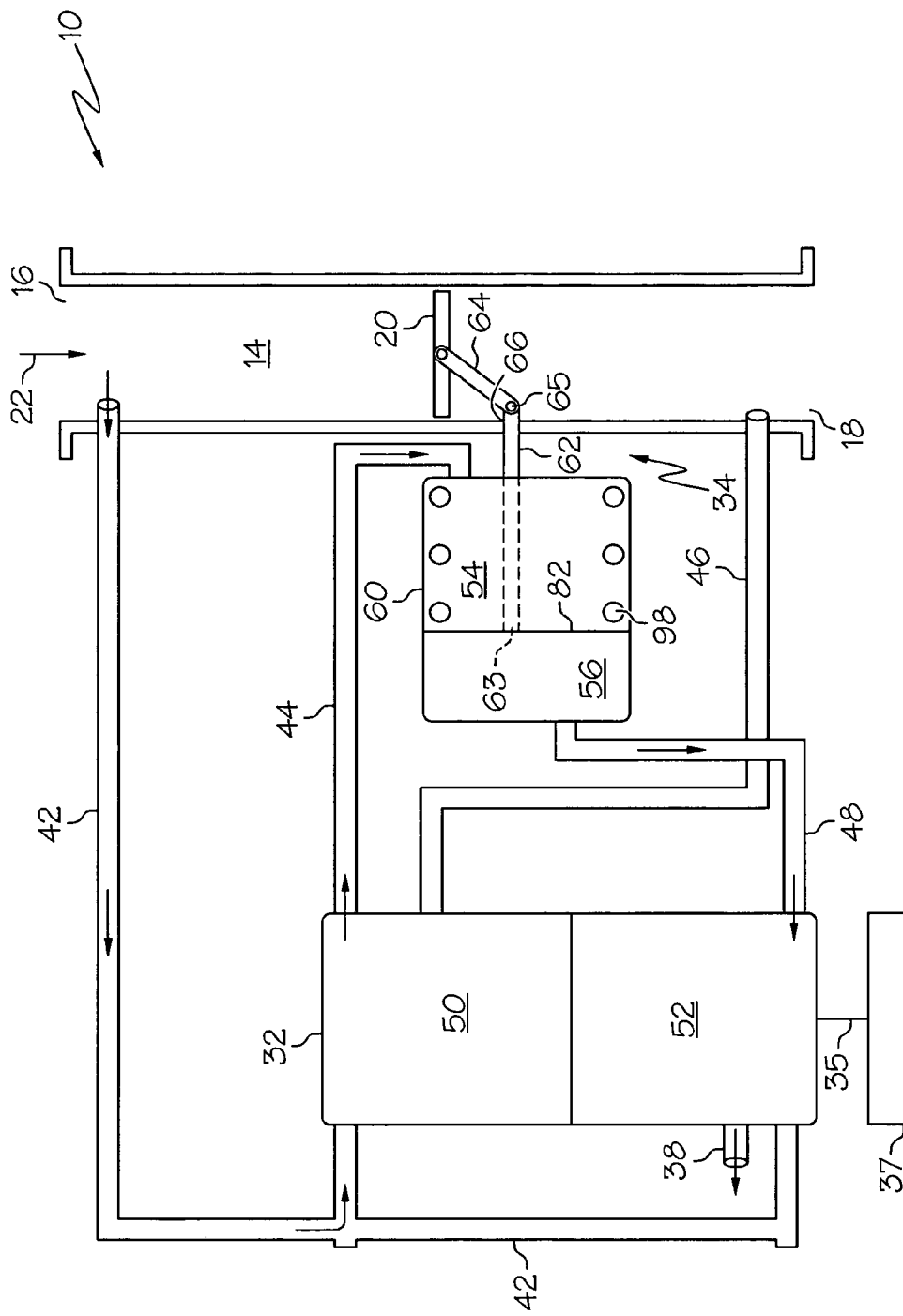
FIGS. 1A-1C are schematic diagrams of a pneumatic valve assembly including a known pneumatic valve actuator.
Figure 1B:
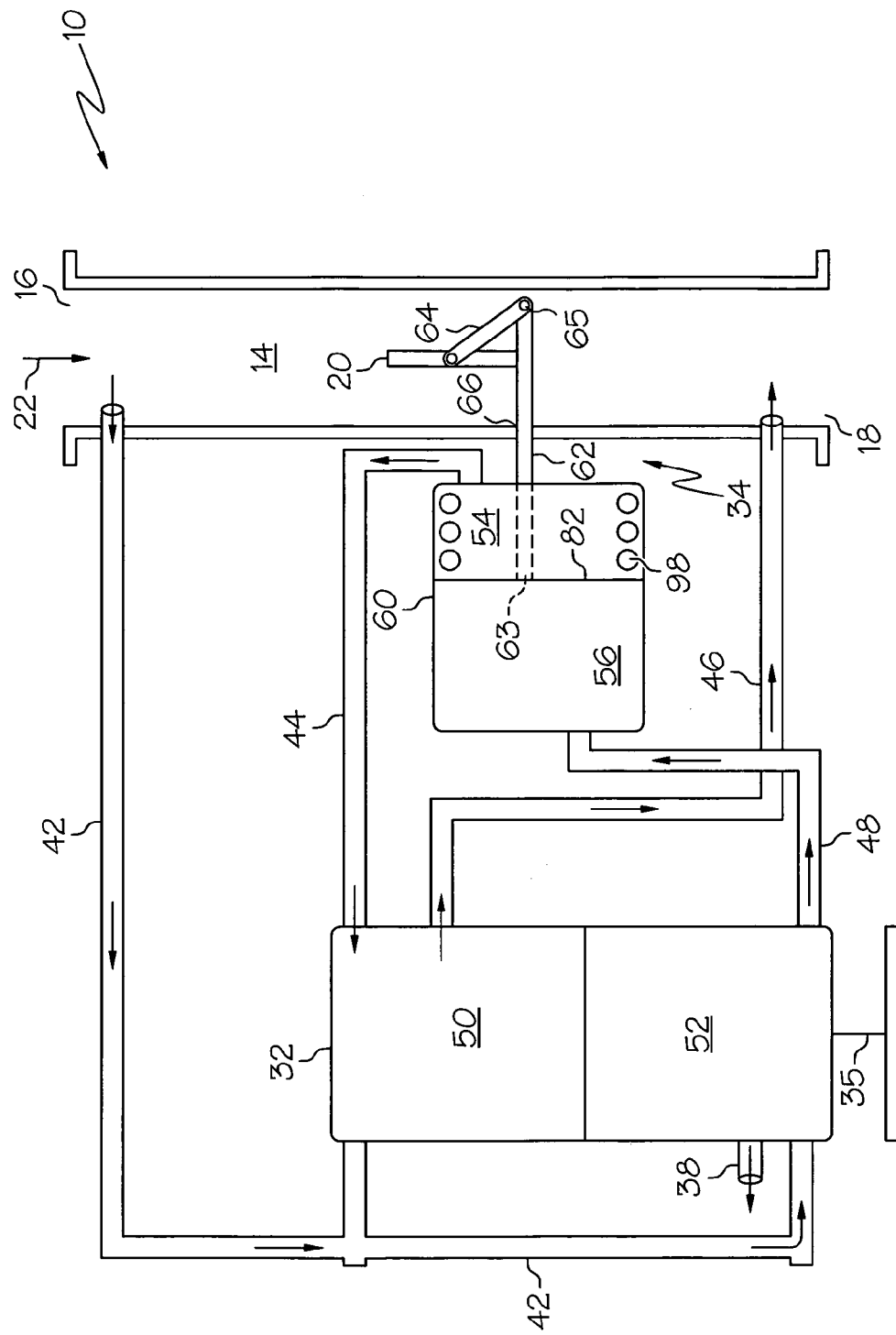
Figure 1C:
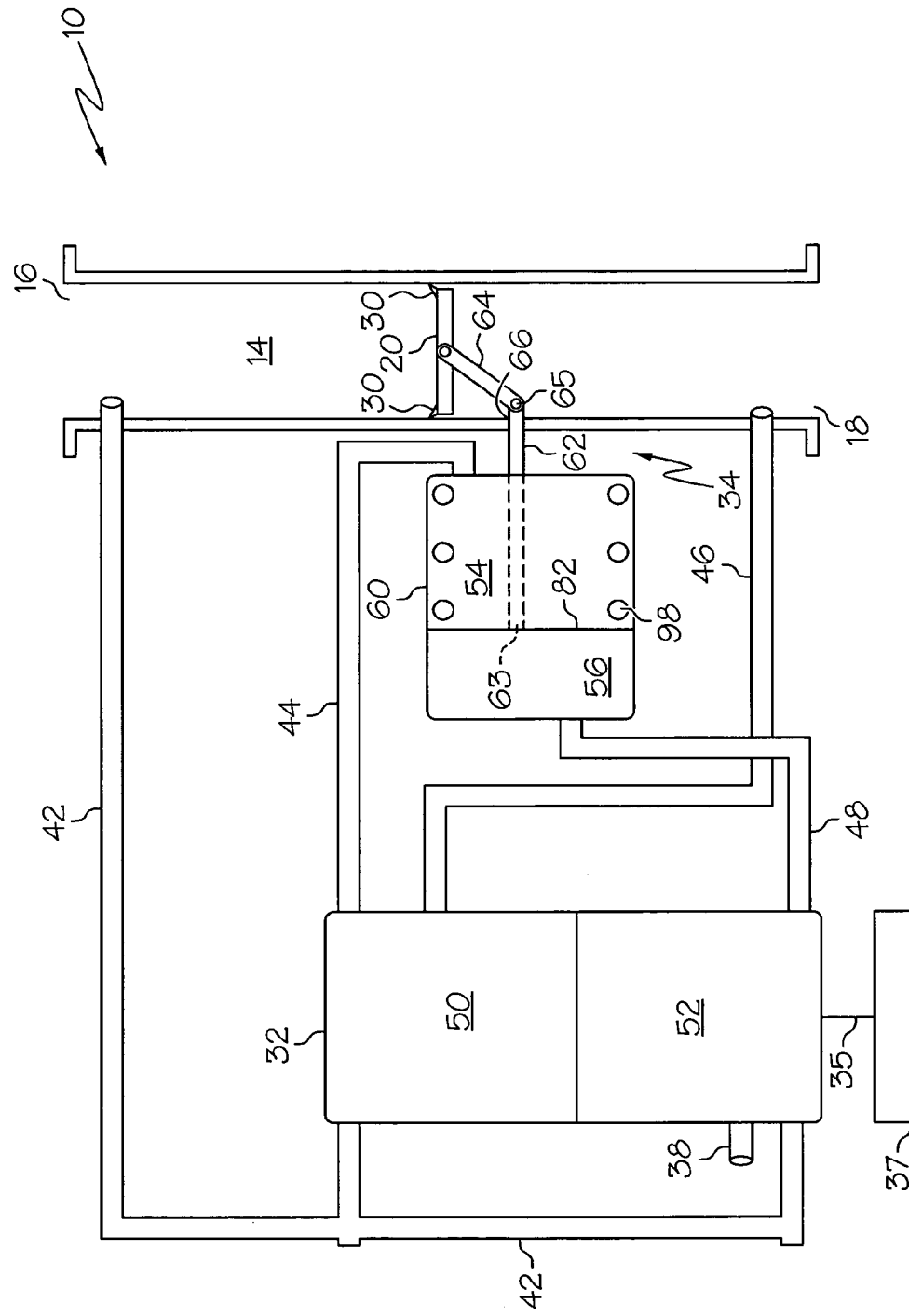

FIGS. 1A-1C are schematic diagrams of a valve assembly 10 (e.g. an ATS valve assembly) configured to control the flow of pressurized air through an airway 14 having an inlet port 16 and an outlet port 18. A flow control valve plate 20 is disposed within airway 14 and is configured to close (FIGS. 1A and 1C) and open (FIG. 1B). When closed, flow control valve plate 20 substantially prevents airflow received at inlet port 16 (represented in FIGS. 1A and 1B by arrow 22) from flowing through airway 14 and to outlet port 18.

Valve assembly 10 is configured such that valve-plate 20 remains closed until the ATS system enters its operational mode; i.e. (1) air flows into inlet port 16, and (2) the valve is commanded to open. After opening, valve plate 20 will remain open until (1) air no longer flows into port 16, or (2) the valve is commanded to close. It should be appreciated that, although depicted in the illustrations as a butterfly valve, valve plate 20 may be one of a variety of types of valves useful to selectively isolate an upstream pressurized fluid source from a downstream component.

For clarity, valve assembly 10 is described as comprising only two valves, an airflow router valve 32 and a main flow control valve 34. As is well-known, however, other types of valves (e.g. reference pressure valves) and other types of components (e.g. filters) may be employed within such a valve assembly. Valves 32 and 34 are fluidly coupled to each other and to airway 14 via four ducts, 42, 44, 46, and 48. Additionally, router valve 32 is fluidly coupled to ambient air by way of a vent 38.

Airflow router valve 32 directs the flow of air within and through two pneumatic chambers 50 and 52 contained therein. Valve 32 is bi-stable and may be remotely switched between two routing modes: a first routing mode (FIG. 1A), wherein chamber 50 directs airflow from duct 42 to duct 44, and chamber 52 directs airflow from duct 48 to vent 38; and a second routing mode (FIG. 1B), wherein chamber 50 directs airflow from duct 44 to duct 46, and chamber 52 directs airflow from duct 42 to duct 48.

Remote actuation of airflow router valve 32 may be accomplished by, for example, energizing or de-energizing a solenoid 37. Solenoid 37 may be coupled to a shaft 35, which is, in turn, coupled to a first stopper and a second spherical stopper (not shown) disposed within chamber 50 and 52, respectively. Solenoid 37, shaft 35, and the stoppers may be biased by a spring (also not shown) toward the first routing mode (FIG. 1A). When remotely triggered (i.e. energized), solenoid 37 compresses the spring and moves shaft 35 and the stoppers into the second routing mode (FIG. 1B). Valve 32 may then be switched back to the first routing mode (FIG. 1A) by de-energizing solenoid 37. In this way, airflow router valve 32 allows the route of air flowing therethrough to be remotely controlled.

Airflow router valve 32 is fluidly coupled to flow control valve 34 via ducts 44 and 48. More specifically, flow control valve 34 comprises an actuator 60 having two pneumatic compartments 54 and 56 that are fluidly coupled to compartments 50 and 52 of airflow router valve 32, respectively, by way of ducts 44 and 46, respectively. As will be more fully explained below, the pressure differential between the compartments of actuator 60 controls the movement and positioning of valve plate 20. This pressure differential, in turn, depends upon the routing mode of airflow router valve 32.

Main flow control valve 34 comprises valve plate 20, a valve plate linkage in the form of a translational shaft 62, a shaft-plate link 64, and an actuator 60. Translational shaft 62 has a first section 63 disposed within actuator 60, and a second section 65 that passes through an aperture 66 provided through the body of airway 14. Second section 65 may be hingedly coupled to shaft-plate link 64, which may be, in turn, fixedly coupled to valve plate 20. The end of first section 63 is coupled to a diaphragm assembly 82 that separates pneumatic chamber 56 from pneumatic chamber 54.

Diaphragm assembly 82 moves within actuator 60 in response to the pressure differential between chambers 56 and 54 in the well-known manner. The movement of diaphragm assembly 82 causes second section 65 to translationally move away from or retract towards aperture 66. Such translational movement of shaft 62 rotates shaft-plate link 64, which opens or closes valve plate 20. More specifically, when second section 65 moves to the right with respect to aperture 66 (i.e. shaft extension), shaft-plate link 64 rotates in a first direction and valve plate 20 opens. When second section 65 retracts toward aperture 66 (i.e. shaft retraction), shaft-plate link 64 rotates in a second, opposite direction and valve plate 20 closes. Spring 98, disposed within flow control valve 34, biases diaphragm assembly 82 such that, when there is little to no pressure differential between chambers 54 and 56, second section 65 is retracted and valve plate 20 is closed.

The pressure differential between compartments 54 and 56 determines the translational movement of shaft 62 in the following way. When the pressure in chamber 54 and spring 98 combine to create a force on diaphragm assembly 82 greater than the force thereon created by the pressure within chamber 56, shaft 62 retracts and valve plate 20 closes. For this reason, chamber 54 may be referred to as a closing chamber. Conversely, when the pressure within chamber 56 creates a greater force on diaphragm assembly 82 than does the combination of the pressure within chamber 54 and spring 98, shaft 62 extends and valve plate 20 opens. For this reason, chamber 56 may be referred to as an opening chamber.

As illustrated in FIG. 1C, in its non-operational mode, little or no air is received at inlet port 16 (e.g. in the case of an ATS valve assembly prior to system initialization), and valve plate 20 is closed. In its operational mode, air is supplied to inlet port 16 (e.g. in the case of an ATS valve assembly after system initialization), and valve plate 20 remains closed until commanded to open by switching the routing mode of airflow router valve 32 (i.e. from the first routing mode illustrated in FIG. 1A to the second routing mode illustrated in FIG. 1B) as, for example, by energizing solenoid 37. This change in routing modes will (1) permit air to flow out of closing chamber 54, through ducts 44 and 46, and into a downstream portion of airway 14; and, (2) permit air to flow from an upstream portion of airway 14, through duct 42 and 44, into opening chamber 56. Opening chamber 56 thus becomes pressurized relative to closing chamber 54. This results in diaphragm assembly 82 moving to the right thus extending shaft 62 and opening valve plate 20.

Valve plate 20 will remain open until (1) air is no longer received at inlet port 16, or (2) it is commanded closed by switching (e.g. with solenoid 37) the routing mode of airflow router valve 32 (i.e. from the second routing mode illustrated in FIG. 1B to the first routing mode illustrated in FIG. 1A). Changing the routing mode of airflow router 32 as just described permits (1) air to flow out of opening chamber 56, through duct 48, through vent 38, and to ambient air; and, (2) air to flow from an upstream portion of airway 14, through ducts 42 and 44, and into closing chamber 54. Closing chamber 54 thus becomes pressurized relative to opening chamber 56. This results in diaphragm assembly 82 to the left retracting shaft 62 and closing valve plate 20.

As previously mentioned, when a pneumatic valve is closed, water may become trapped between the valve plate and the airway's interior and valve icing may occur. FIG. 1C illustrates this problem of valve icing. As can be seen, condensation 30 collects and is frozen at the interface of valve plate 20 and the interior of airway 14. As will be more fully explained hereinbelow, the present invention mitigates this problem by opening, preferably only slightly, the valve plate when substantially no air is received by inlet port 16 (e.g. in the case of an ATS starter control valve assembly after engine shutdown).

As previously mentioned, in actuator assembly 60, the movement of diaphragm assembly 82 and shaft 62 depends upon the pressure differential between closing chamber 54 and opening chamber 56. More specifically, three forces may act on diaphragm assembly 82 at any given time: (1) the force exerted by air within chamber 54, (2) the force exerted by air within chamber 56, and (3) the force exerted by spring 98. When the cumulative force exerted by spring 98 and the air within chamber 54 is greater than that exerted by the air within chamber 56, diaphragm assembly 82 moves to the left, shaft 62 retracts, and valve plate 20 closes (FIGS. 1A and 1C). Conversely, when the cumulative force exerted by spring 98 and the air within chamber 54 is less than that exerted by the air within chamber 56, diaphragm assembly 82 moves to the right, shaft 62 extends, and valve plate 20 opens (FIG. 1B).

Figure 2A:
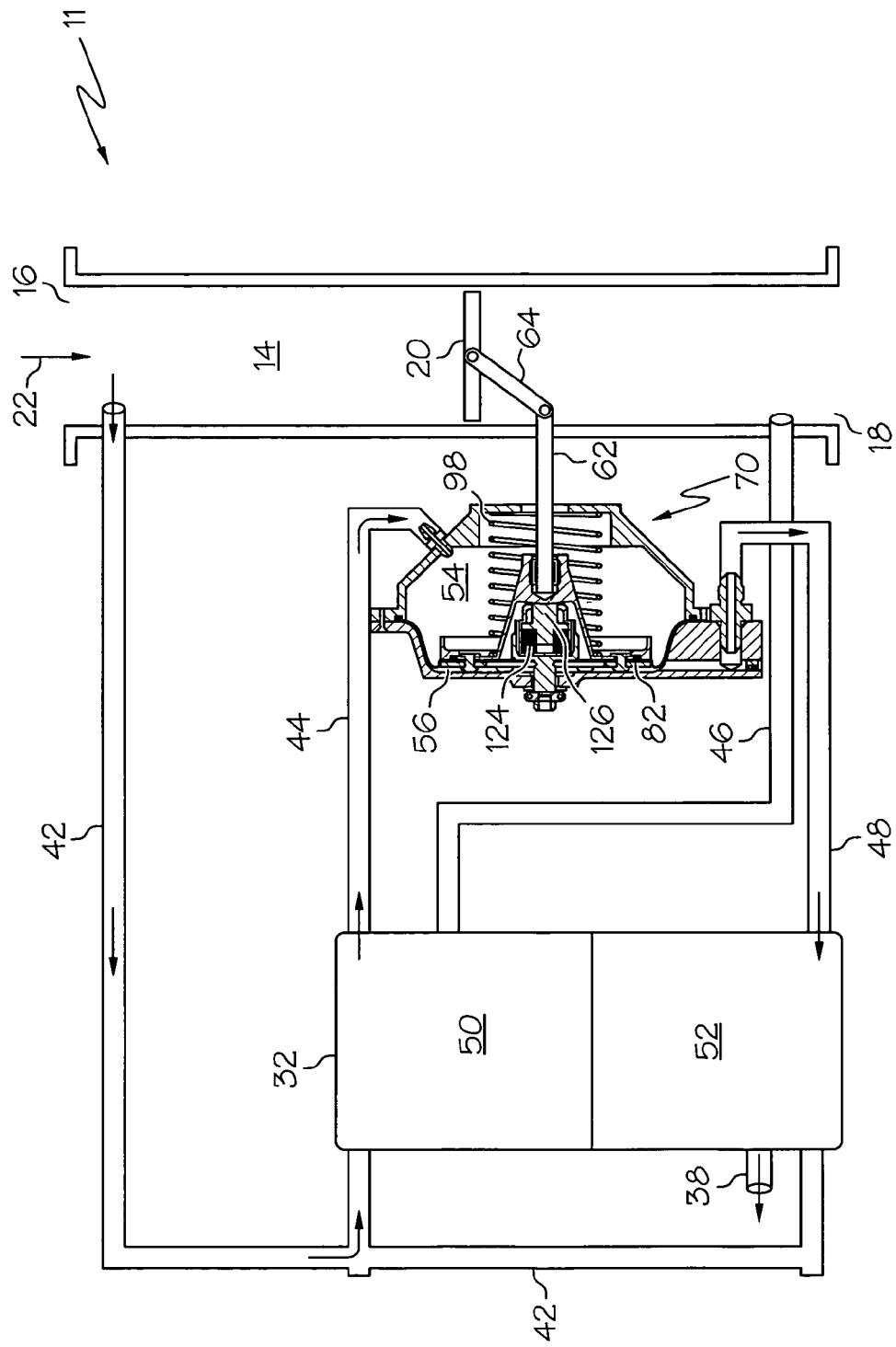
FIGS. 2A-2C are schematic diagrams of a valve assembly similar to that depicted in FIGS. 1A-1C including the inventive pneumatic valve actuator assembly.
Figure 2B:
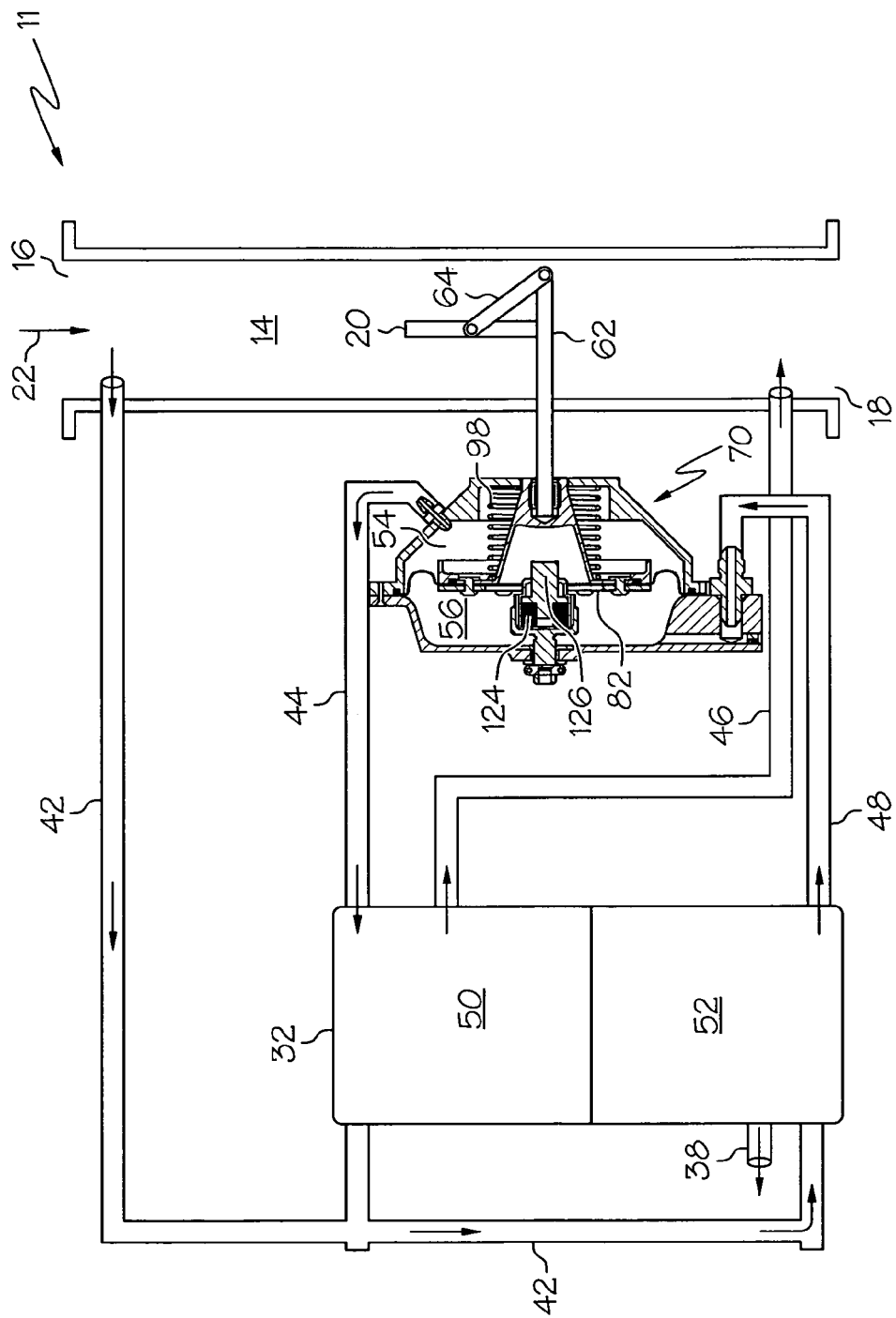
Figure 2C:
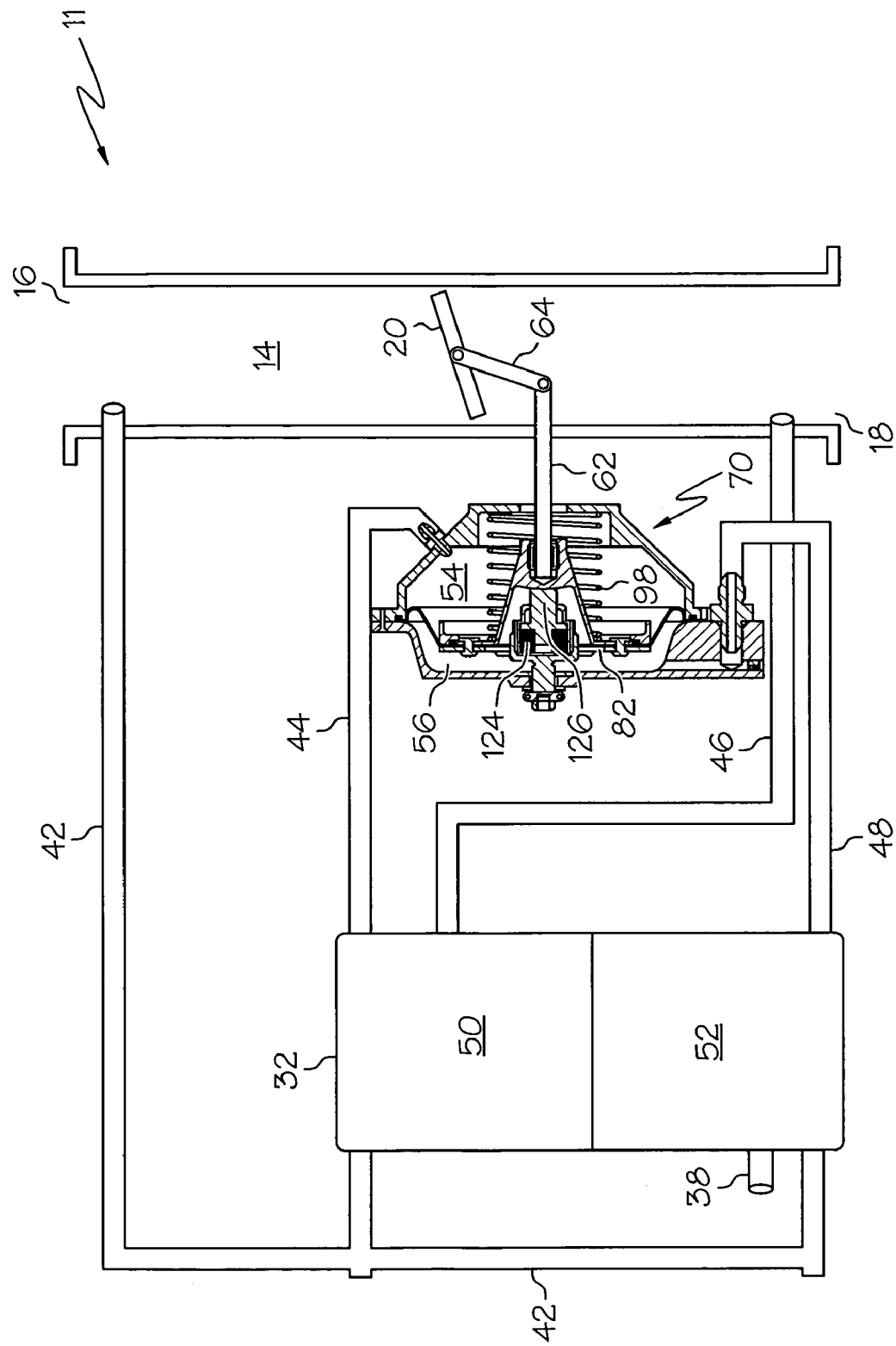

FIGS. 2A-2C are schematic diagrams of a valve assembly 11. Valve assembly 11 differs from valve assembly 10 in that the known actuator 60 has been replaced with an exemplary embodiment of the inventive actuator assembly 70, which comprises a first or primary actuator and a second or secondary actuator to be more fully described hereinbelow. As may be most fully appreciated by comparing FIGS. 1A and 1B to FIGS. 2A and 2B, respectively, valve assembly 11 and actuator assembly 70 function in substantially the same way as do valve assembly 10 and actuator 60 when airflow is received at inlet port 16 (i.e. its operational mode). As this has been described in detail above, the following focuses on the way in which the secondary actuator of actuator assembly 70 opens, preferably slightly, valve plate 20 when little to no air is received at inlet port 16 (i.e. its operational mode) and, consequently, when the pressure within chamber 54 and chamber 56 is approximately equal. When valve plate 20 is slightly opened, moisture will not collect at the valve plate/airway body interface and valve icing is avoided.

Figure 3:
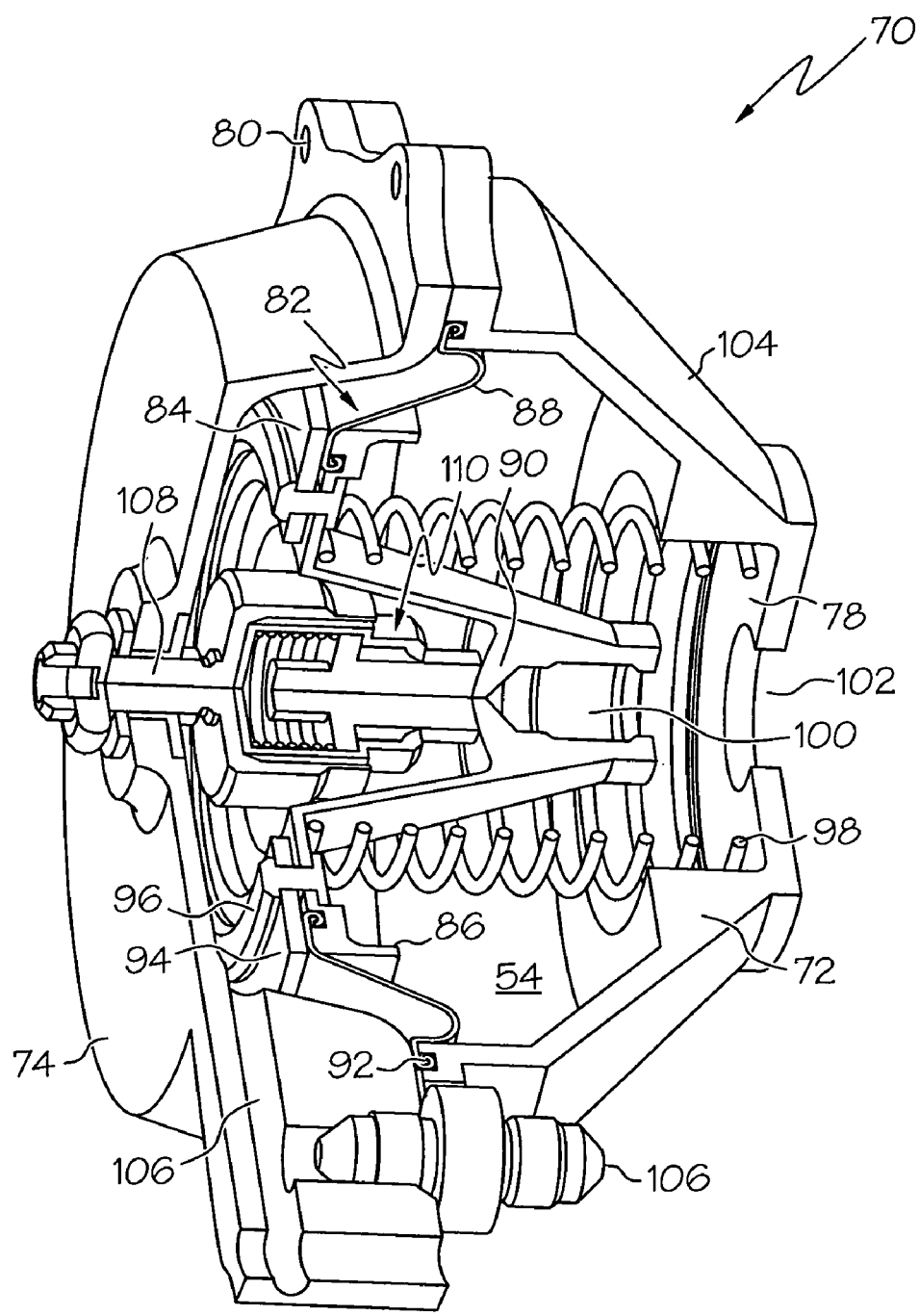
FIGS. 3 and 4 are isometric cut-away and cross-sectional views, respectively, of the inventive valve actuator assembly in accordance with an exemplary embodiment of the present invention.
Figure 4:
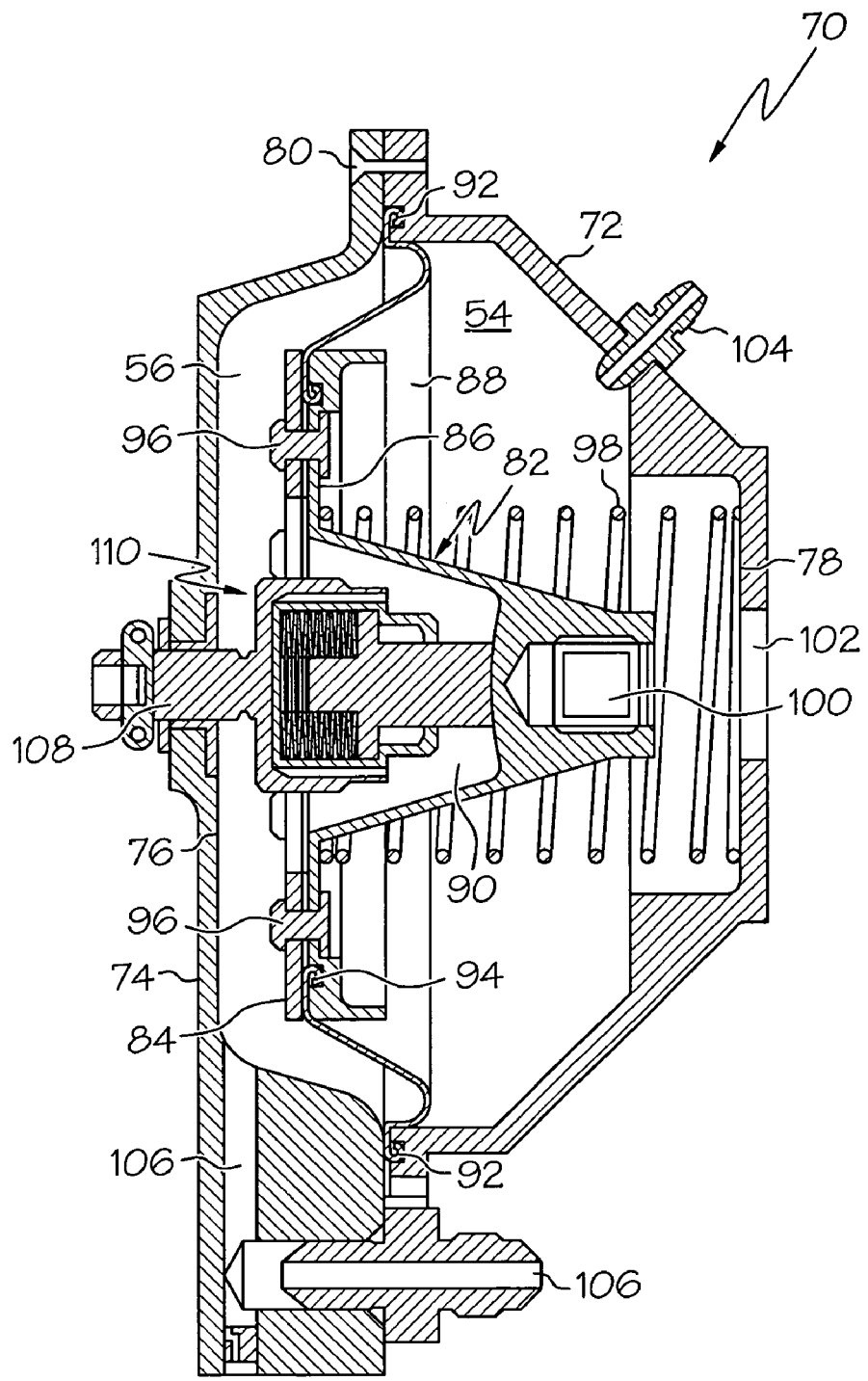

As can be seen in FIGS. 3 and 4, which are isometric and cross-sectional views, respectively, actuator assembly 70 comprises housing 72 including a housing cap 74. Actuator assembly 70 has a first inner surface 76 (identified in FIG. 4) and, substantially opposite thereto, a second inner surface 78. Housing cap 74 is coupled to the body of housing 72 by way of a plurality of fasteners 80. A diaphragm assembly 82 comprises a first section 84 and a second section 86, which cooperate to form a piston-enclosure 90. Diaphragm 88 has an outer lip 92 that is coupled to housing 72 between cap 74 and the body of housing 72, and an inner lip 94 that is coupled between first section 84 and second section 86 by a plurality of fasteners 96.

Diaphragm assembly 82 further includes a shaft-receiving cavity 100 configured to receive (e.g. threadably) translational shaft 62 (FIGS. 2A, 2B, and 2C). Shaft 62 passes through an aperture 102 provided in housing 72. The diaphragm assembly biasing spring 98 is mounted within housing 72 and is compressed between section 86 of diaphragm assembly 82 and surface 78 of housing 72. As previously alluded to, spring 98 biases diaphragm assembly 82 toward housing cap 74 and consequently biases shaft 62 retracted and valve plate 20 closed.

Diaphragm assembly 82 divides the interior of housing 72 into a closing chamber 54 and an opening chamber 56. Closing chamber 54 is defined by surface 78 of housing 72 and section 86 of diaphragm assembly 82, and opening chamber is defined by surface 76 of housing cap 74 and section 84 of diaphragm assembly 82. Closing chamber 54 and opening chamber 56 fluidly communicate with the rest of pneumatic valve assembly 11 via ducts 44 and 48 (FIGS. 2A, 2B, and 2C), respectively. Ducts 44 and 48 are fluidly coupled to chambers 54 and 56, respectively, by way of ports 104 and 106, respectively.

The position at which diaphragm assembly 82 may be closest to housing cap 74 (i.e. the valve closed diaphragm position) is determined by an adjustment mechanism in the form of a valve closed stop adjustment 108, which positions a second actuator in the form of a low-pressure valve opener 110 within actuator assembly 70. Valve closed stop adjustment 108 and low-pressure valve opener 110 are shown in more detail in FIG. 5.

Figure 5:
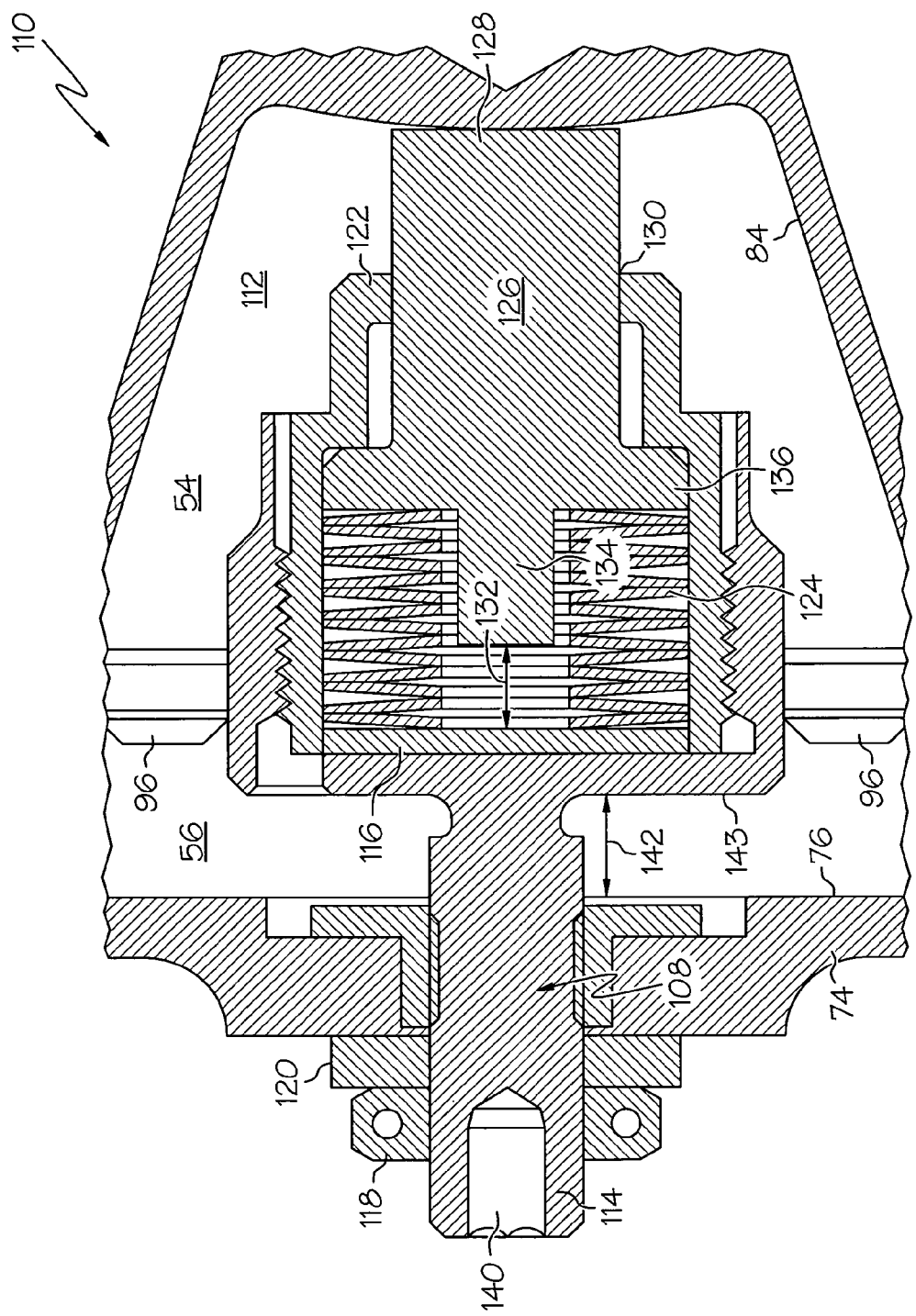
FIG. 5 is a cross-sectional view of the low-pressure valve opener and valve closed stop adjustment of the valve actuator assembly depicted in FIGS. 3 and 4.

Referring to FIG. 5, it can be seen that valve closed stop adjustment 108 includes an externally-threaded shaft 114 comprising a first end having a cavity 140 therein and a second end in the form of a stop plate 116. It should be noted that pressure must be applied to closing chamber 54 to adjust the closed stop. The first end of shaft 114 is coupled (e.g. threadably) to cap 74 by means of an internally-threaded jam nut 118 and a washer 120. The first end of shaft 114 may be accessible from the exterior of the pneumatic valve assembly so that valve-closed stop adjustment 108 may be manipulated (i.e. rotated) to adjust the distance between surface 143 and surface 76 of cap 74, as indicated in FIG. 5 by arrow 142. For example, with jam nut 118 removed, shaft 114 may be turned with, for example, a wrench tool to adjust the distance between surface 143 and surface 76 and therefore the position of low-pressure valve opener 110 within actuator assembly 70. This will adjust the degree to which the valve will be closed. The disposition of low pressure valve opener 110 within actuator assembly 70 also controls the valve closed diaphragm assembly position and thus the closed position of flow control valve plate 20 (FIG. 2A) when little to no air is received at inlet port 16 (FIG. 2C).

Low-pressure valve opener 110 comprises a housing 122, a spring 124, and a plunger 126. Housing 122 is fixedly coupled to valve-closed stop adjustment 108. Plunger 126 is disposed partially within housing 122 and has an elongated portion 128 that extends through an aperture 130 provided in housing 122. Plunger 126 comprises an extension 134 and a cuff 136. Plunger 126 may slide longitudinally (i.e. left or right) relative to housing 122. The range of motion for plunger 126, which is represented by arrow 132 in FIG. 5, is limited (1) by the abutment of extension 134 against stop plate 116 when plunger 126 is fully retracted, and (2) by the abutment of cuff 136 against an inner wall 138 of housing 122 when plunger 126 is fully extended as shown in FIG. 5.

Referring again to FIG. 2B, it can be seen that, when shaft 62 is extended, plunger 126 does not abut diaphragm assembly 82. In contrast, it can be seen in FIGS. 2A and 2C, that plunger 126 does abut diaphragm assembly 82 when shaft 62 is fully retracted. For diaphragm assembly 82 to fully move into valve closed diaphragm assembly position, the cumulative force exerted on assembly 82 by spring 98 and the pressure within chamber 54 must be greater than the cumulative force exerted on assembly 82 by spring 124 and the pressure within chamber 56. As illustrated in FIG. 2A, when in the valve closed diaphragm position, diaphragm assembly 82 contacts plunger 126 causing it to retract and thereby compress spring 124.

Unlike the situation in FIG. 2A, FIG. 2C shows assembly 11 when substantially no air is received by inlet port 16 and the pressure within pneumatic chambers 56 and 54 is substantially equal. In this condition, spring 124 is opposed primarily by spring 98. Spring 124 is chosen such that its force of expansion is slightly greater than that of spring 98. Thus, when the pressure differential between chambers 54 and 56 is sufficiently minimal (for example, in the case of an ATS valve assembly, after the system is shut-down and the pressure within both chambers is substantially equal to ambient pressure), spring 124 expands thereby extending plunger 126, which contacts diaphragm assembly 82 and pushes it to the right. This results in the slight compression of spring 98, the slight extension of shaft 62, and the slight opening of valve plate 20 as is shown in FIG. 2C thus discouraging the accumulation of condensation. The degree to which valve plate 20 is opened is dependent in part on the position of low pressure valve opener 110 within actuator assembly 70. Valve plate 20 will remain slightly opened until (1) solenoid 37 is de-energized, (2) air is again received by inlet port 16, and (3) a sufficient pressure differential is created between chambers 54 and 56. When all these conditions are met (e.g. FIG. 2A), diaphragm assembly 82 will move back into the valve closed diaphragm assembly position, shaft 62 will fully retract, and valve plate 20 will close.

While the invention has been described with reference to a preferred embodiment, it will be understood by those skilled in the art that various changes may be made and equivalents may be substituted for elements thereof without departing from the scope of the invention. It should be appreciated that, although the preferred embodiment of the inventive pneumatic valve assembly is configured to slightly open the valve plate to prevent valve icing, the valve assembly may be configured to open the valve plate to any degree providing that the opening is sufficient to prevent the collection of water. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An actuator assembly for use in conjunction with a pneumatic valve assembly of the type which includes an airway having an inlet port, an outlet port, and a valve disposed within the airway and configured to be moved between an open position and a closed position, the actuator assembly comprising:
   a first housing;
   a first actuator coupled to the valve for moving the valve between the open position and the closed position when in a first operational mode, comprising;
      a diaphragm assembly disposed within the first housing and configured to be coupled to the valve such that the flexing of the diaphragm assembly results in the movement of the valve; and
      a first spring disposed in said first housing and biasing said diaphragm assembly in a direction corresponding to the closed position of the valve; and
   a second actuator coupled to the valve for opening the valve when in a second operational mode, comprising:
      a second housing substantially contained within said first housing and having an aperture therethrough; and
      a plunger partially disposed within said second housing and configured to translate relative to said second housing between an extended position and a retracted position, said plunger engaging said diaphragm assembly when the valve is proximate the closed position and biasing said diaphragm assembly in a direction corresponding to the open position of the valve.

2. An actuator assembly according to claim 1 wherein air flows into the inlet port in said first operational mode, and substantially no air flows into the inlet port in said second operational mode.

3. An actuator assembly according to claim 1 wherein said second actuator is configured to open the valve to an intermediate position between said open position and said closed position.

4. An actuator assembly according to claim 3 wherein said intermediate position is a slightly open position sufficient to prevent the accumulation of water within the airway.

5. An actuator assembly according to claim 3 wherein the pneumatic valve assembly includes a valve linkage coupled to the valve and wherein said first actuator and said second actuator are coupled to the valve linkage.

6. An actuator assembly according to claim 1 wherein said first housing comprises a first pneumatic chamber and a second pneumatic chamber and wherein said second actuator is configured to place the valve in said intermediate position when the pressure within said first pneumatic chamber and said second pneumatic chamber is substantially equal.

7. An actuator assembly according to claim 1 wherein said second actuator further comprises:
   a second spring disposed within said second housing for biasing said plunger toward said extended position, said plunger engaging said diaphragm assembly when the valve is proximate the closed position.

8. An actuator assembly according to claim 7 wherein said second spring is compressed when the valve is in the closed position.

9. An actuator assembly according to claim 8 wherein the force of expansion of said second spring exceeds the force of expansion of said first spring.

10. An actuator assembly according to claim 9 further comprising an adjustment mechanism coupled to said first housing and to said second housing for adjusting the position of said second actuator within said first housing.

11. A pneumatic valve assembly, comprising:
    an airway having an inlet port and an outlet port;
    a valve disposed within said airway between said inlet port and said outlet port, said valve configured to move between an open position and a closed position;
    a valve linkage having a first section coupled to said valve and a second section, said valve linkage configured to translate relative to said valve so as to move said valve between said open position and said closed position; and
    an actuator assembly coupled to said second section and configured to translate said valve linkage, comprising:
       a first actuator coupled to said valve for moving said valve between said open position and said closed position when pressurized air substantially flows into said inlet port; and
       a second actuator means coupled to said valve for automatically opening said valve when pressurized air does not substantially flow into said inlet port.

12. An actuator assembly according to claim 11 wherein said second actuator means is configured to open said valve to an intermediate position between said open position and said closed position.

13. An actuator assembly according to claim 12 wherein said intermediate position is a slightly open position sufficient to prevent the accumulation of water within said airway.

14. An actuator assembly according to claim 12 wherein said actuator assembly further comprises a first housing for said first actuator and said second actuator means.

15. An actuator assembly according to claim 14 wherein said first housing comprises a first pneumatic chamber and a second pneumatic chamber and wherein said second actuator means is configured to place said valve in said intermediate position when the pressure within said first pneumatic chamber and said second pneumatic chamber is substantially equal.

16. An actuator assembly according to claim 15 wherein said first actuator comprises:
    a diaphragm assembly coupled to said valve linkage and configured for movement within said first housing and separating said first pneumatic chamber and said second pneumatic chamber; and
    a first spring disposed within said first housing for biasing said diaphragm assembly in a first direction corresponding to said closed position of said valve.

17. An actuator assembly according to claim 16 wherein said second actuator means comprises:
    a second housing fixedly coupled to said first housing and having an aperture therethrough;
    a plunger partially disposed within said second housing and configured to translate relative to said second housing between an extended position and a retracted position; and
    a second spring disposed within said second housing for biasing said plunger toward said extended position, said plunger engaging said diaphragm assembly when said valve is proximate said closed position.

18. An actuator assembly according to claim 17 wherein said second spring is configured to be compressed when said valve is in said closed position.

19. An actuator assembly according to claim 18 wherein the force of expansion of said second spring exceeds the force of expansion of said first spring.

20. An actuator assembly according to claim 19 further comprising an adjustment mechanism coupled to said first housing and to said second housing for adjusting the position of said second actuator means within said first housing.

21. An actuator assembly for use in conjunction with a pneumatic valve assembly of the type which includes an airway having an inlet port; an outlet port; a valve disposed within the airway and configured to be moved between an open position and a closed position; and, a valve linkage having a first section coupled to the valve and a second section, the valve linkage configured to translate relative to the valve so as to move the valve between the open position and the closed position, the actuator assembly comprising:
- a first housing coupled to the body of said airway and having an aperture therethrough configured to slidably receive said valve linkage;
- a first actuator substantially disposed within said first housing, said first actuator comprising:
  - a diaphragm assembly coupled to the second section and configured to move within said first housing so as to translate the valve linkage when air flows into the inlet port; and
  - a first spring for biasing said diaphragm assembly in a first direction corresponding to the closed position of the valve; and
- a second actuator substantially disposed within said first housing, said second actuator comprising:
  - a second housing fixedly coupled to said first housing and having an aperture therethrough;
  - a plunger partially disposed within said second housing and configured to pass through said aperture of said second housing and translate relative to said second housing between an extended position and a retracted position, said plunger engaging said diaphragm assembly when the valve is proximate the closed position; and
  - a second spring disposed within said second housing for biasing said plunger toward said extended position and configured to extend said plunger and move said diaphragm assembly in said first direction when substantially no air flows into the inlet port.

22. An actuator assembly according to claim 21 wherein said second actuator is configured to open the valve to an intermediate position between the open position and the closed position.

23. An actuator assembly according to claim 22 wherein said intermediate position is a slightly open position sufficient to prevent the accumulation of water within the airway.

24. An actuator assembly according to claim 23 wherein said first housing comprises a first pneumatic chamber and a second pneumatic chamber and wherein said second actuator is configured to place said valve in said intermediate position when the pressure within said first pneumatic chamber and said second pneumatic chamber is substantially equal.

25. An actuator assembly according to claim 24 wherein the force of expansion of said second spring exceeds the force of expansion of said first spring.

26. An actuator assembly according to claim 25 further comprising an adjustment mechanism coupled to said first housing and to said second housing for adjusting the position of said second actuator within said first housing.

* * * * *